April 5, 1949.  J. W. ULMER  2,466,625

REAR VISION MIRROR HAVING POLARIZING MEANS

Filed Nov. 3, 1947

Inventor

Julius W. Ulmer

By Clarence A. O'Brien
and Harvey B. Jacobson
Attorneys

Patented Apr. 5, 1949-

2,466,625

UNITED STATES PATENT OFFICE 2,466,625

REAR-VISION MIRROR HAVING POLARIZING MEANS

Julius W. Ulmer, Menno, S. Dak.

Application November 3, 1947, Serial No. 783,727

2 Claims. (Cl. 88—65)

This invention relates generally to rear vision mirrors as used in automobiles, trucks and other vehicles, and more particularly to a rear vision mirror in which the mirror proper is provided with a light polarized panel, ordinarily glass, fixed to the mirror and another light polarized panel rotatably mounted with reference to the first mentioned panel.

A primary object of this invention is to provide a rear vision mirror which can be adjusted for night driving so as to effectively eliminate the glare from the headlights of vehicles approaching from the rear, while still permitting the reflection of these headlights to be seen in the mirror.

Another object of this invention is to provide a device of this character which is extremely simple to adjust from the position used for day driving into the position used for night driving, and vice versa, the outside member in the assembly being simply rotatable by hand to the desired extent.

Still another object of this invention is to provide a device of this character in which the adjustable part is itself adjustable as to frictional contact with the supporting bar used to mount the whole assembly.

Still another object of this invention is to provide a glare-proof rear vision mirror, using a minimum number of parts, each part being readily replaceable.

And a last object to be specifically mentioned is to provide a device of this character which is relatively inexpensive and practicable to manufacture, extremely simple to install, adjust and use, and which will give generally efficient and durable service.

With these objects definitely in view, together with other objects which will appear hereinafter as this description proceeds, this invention resides in certain novel features of construction, combination and arrangement of parts and portions as will be fully described in the specification, particularly pointed out in the appended claims, and illustrated in the accompanying drawings which form a material part of this application, and in which:

Similar characters of reference designate similar or identical parts and portions throughout the specification and throughout the several views of the drawing.

Figure 1:
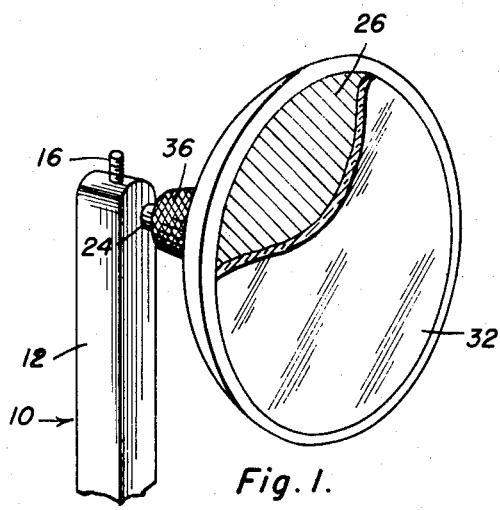
Figure 1 is a perspective view of the assembled rear vision mirror, with a part of the outside polarized panel being broken away to show the relationship of the underlying panel, which will be hereinafter described as the inside panel.
Figure 2:
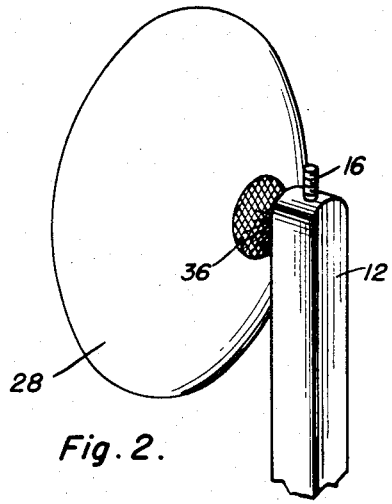
Figure 2 is another perspective view from the rear side of the assembly illustrated in Figure 1.
Figure 3:
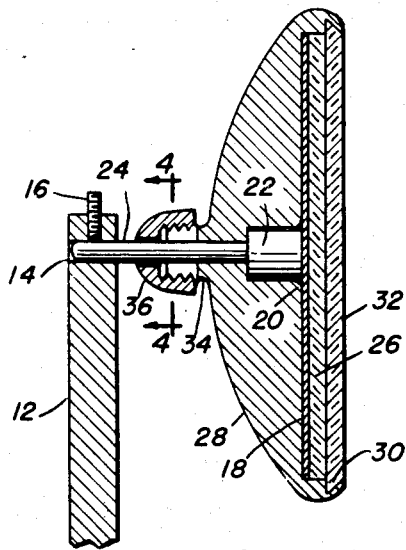
Figure 3 is a vertical sectional view of the same structure, the supporting bar being shown in elevation; and, Figure 4 is a vertical transverse sectional view, taken on the line 4—4 in Figure 3, and showing the upper portion of the member in which the supporting bar is supported in elevation.
Figure 4:
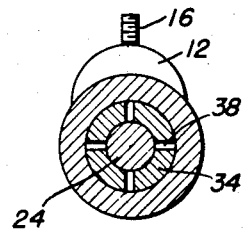

Referring now to the drawing in detail, it will be noted that the environment wherewith this invention is adapted to be used will ordinarily include an automobile, truck or other vehicle, used under conditions when bright lights positioned to the rear of the vehicle are likely to be encountered during the operation thereof, as in night driving. Under these conditions, vision of the road to the rear of the vehicle is ordinarily of such limited character that the operator of the vehicle willingly will dispense with such limited observation in order to avoid the unpleasant glare from headlights approaching from the rear of the vehicle. Accordingly, this invention envisages provision of means to effectively prevent this glare, while still permitting the headlights of vehicles approaching from the rear to be seen. The environment referred to above will ordinarily include some supporting structure, generally indicated at 10 as comprised of an upright 12, with a bore 14 therein, and a set screw 16, it being understood that the representation of these parts is strictly illustrative rather than limiting.

The mirror proper is comprised of a rigid plate 18 of circular shape and provided with a mirror finish on what will be considered the outside surface thereof and this plate 18 is circular in shape and is axially supported by direct attachment, as indicated at 20, to an enlarged portion 22 of a supporting bar 24, the other end of this bar being adjustably secured in the recess or bore 14 in the supporting member 12, or to some other type of support in a functionally equivalent manner. A panel of light polarizing material, ordinarily glass sold under the trade name "Polaroid," co-extensive with the plate 18, is affixed to the front side thereof. At this time, it should be noted that the details of the means used to affix this panel 26 to the plate 18, while providing for a mirror finish to reflect light from the rear base of the panel 26 or from the front face of the plate 18, is not thought to be particularly material in this application, it being also conceivable that a reflecting medium may be applied directly to the panel 26, whereafter this "silvered" surface is directly secured by adhesives to the plate 18.

A casing 28 is axially apertured to allow the same to be mounted for free rotation on the supporting bar 24, the bore in the casing provided for the bar being, of course, stepped to accommodate the enlargement 22, and is also stepped to receive the plate 18 and the panel 26. On what is considered the outside of the casing 28, there is provided a bezel 30 to receive another circular panel of "Polaroid" glass or other light polarizing material 32. It should be noted that the formation of the step to receive the plate 18 and panel 26 and bezel 30 is such that the two panels 26 and 32 are spaced slightly apart to prevent scratching of the juxtaposed surfaces when the casing 28 and outer panel 32 are turned manually with reference to the panel 26.

In order that the frictional co-efficient between the supporting bar 24 and the casing 28 may be altered to prevent accidental shifting of the casing, while still allowing ready manipulation thereof by the operator of the vehicle, the casing is provided with a neck portion 34 which is externally threaded to receive a thumb-nut 36, the neck 34 being slotted as indicated at 38 and the thumb-nut and neck having each slightly tapered threaded portions whereby turning of the thumb-nut 36 onto the neck will cause the segments of the neck to firmly grasp the supporting bar 24.

The assembly of this invention will be clearly understood from a consideration of the drawing, and the operation of this invention will be clearly understood from the foregoing description of the mechanical details thereof, taken in connection with the above recitation of the objects sought to be achieved thereby. In recapitulation, it may be pointed out that adjustment of the mirror from the position used for day driving to the position used for night driving, and vice versa, is accomplished by the operator of a vehicle in which this device is installed, by merely turning the casing 28 and the outside panel 32 relative to the fixed panel 26.

Obviously, many minor variations may be made in the details of construction and proportionment of the various parts of this invention, without departure from the spirit and scope thereof, and this invention should be limited only by a proper interpretation of the terms used in the appended claims.

Having described the invention what is claimed as new is:

1. A rear view mirror comprising a relatively fixed mirror, a light polarizing panel secured to the front of said mirror, a second light polarizing panel on the side of the first mentioned panel remote from said mirror and rotatably associated with the first mentioned panel, a supporting bar secured to the rear side of said mirror, and a casing having portions extending beyond the edges of the mirror and being rotatably mounted on said bar and carrying said second panel.

2. A rear view mirror comprising a relatively fixed mirror, a light polarizing panel secured to the front of said mirror, a second light polarizing panel on the side of the first mentioned panel remote from said mirror and rotatably associated with the first mentioned panel, a supporting bar secured to the rear side of said mirror, and a casing having portions extending beyond the edges of the mirror and being rotatably mounted on said bar and carrying said second panel, said casing having means for frictionally mounting said casing on said bar so as to be rotatively adjustable.

JULIUS W. ULMER.

REFERENCES CITED

The following references are of record in the file of this patent:

UNITED STATES PATENTS

| Number | Name | Date |
|---|---|---|
| 1,991,363 | Hodny et al. | Feb. 19, 1935 |
| 2,304,504 | Metzger | Dec. 8, 1942 |
| 2,367,096 | Chubb, Jr. | Jan. 9, 1945 |